June 13, 1933.  W. H. BRISTOL ET AL  1,914,106
CROSS LINK FOR TIRE CHAINS
Filed Feb. 11, 1930

INVENTORS
WILLIAM H. BRISTOL &
BY  FRANK A. SMITH
ATTORNEY

Patented June 13, 1933

1,914,106

UNITED STATES PATENT OFFICE

WILLIAM H. BRISTOL, OF WATERBURY, AND FRANK A. SMITH, OF UNION CITY, CONNECTICUT, ASSIGNORS TO THE BRISTOL COMPANY, OF WATERBURY, CONNECTICUT, A CORPORATION OF CONNECTICUT

CROSS-LINK FOR TIRE CHAINS

Application filed February 11, 1930. Serial No. 427,455.

The invention relates to an improved link for use in the cross-chain of chains to be fitted over pneumatic tires of motor vehicles; and it has for its object to afford a more effective link member and one which will remain in active service appreciably longer than the particular type of link now usually employed for this purpose. A cross-chain may be constituted in whole or in part only of the novel link members and in the latter instance providing the most active contact elements, the remainder of the cross-chain being made up then of less expensive elements of the usual and well-known construction.

In carrying out the invention, a suitable metal such as mild steel is forged to an elongated form with eyes at its opposite ends and twisted or turned so that these eyes lie in planes substantially at right angles to each other. The one eye of a link initially remains open to permit of inter-connecting a link member with an adjacent link, whereupon said eye is suitably closed, as by welding its open ends together. In twisting the link member, furthermore, there is formed at the intermediate portion a pair of oppositely disposed convex enlargements or rib elements which are raised sufficiently to cause their respective upper top edges to lie substantially in the same plane as the corresponding contacting surfaces of the eye members upon opposite sides thereof. By this expedient, not only is a link member strengthened at its intermediate point but each link affords contact at three distinct points with the traction surface over which the vehicle to which the chain is attached travels. These three edges or bearing portions will take all the wear; and due to the substantial structure will not be crushed in action.

The raised portions or ribs, moreover, are preferably inclined to the longitudinal axis of the link, for example, at an angle of 45° to said axis or to the line of travel, to better resist sidewise movement of the vehicle as well as the normal forward movement. The links, furthermore, being symmetrical may, after wearing down on one face, be turned over to present the opposite face for further use of the chain composed thereof.

If desired, the life of a link may be considerably prolonged by reinforcing said bearing edges as in case-hardening the wearing surfaces or, for example, there may be introduced therein an insert member of some extremely hard metal or alloy as stellite or manganese or chrome steel. The inserts are preferably secured at the particular portions substantially transversely to their length; and being surrounded by a softer metal portion of the body of the link, will wear away less rapidly than the former and provide for slightly raised gripping elements. Also, the cross-section of the eye members may be thickened slightly at the inside at points opposite the high contact edges to delay the wearing through of a link.

The nature of the invention, however, will best be understood when described in connection with the accompanying drawing, in which.

Figure 1:
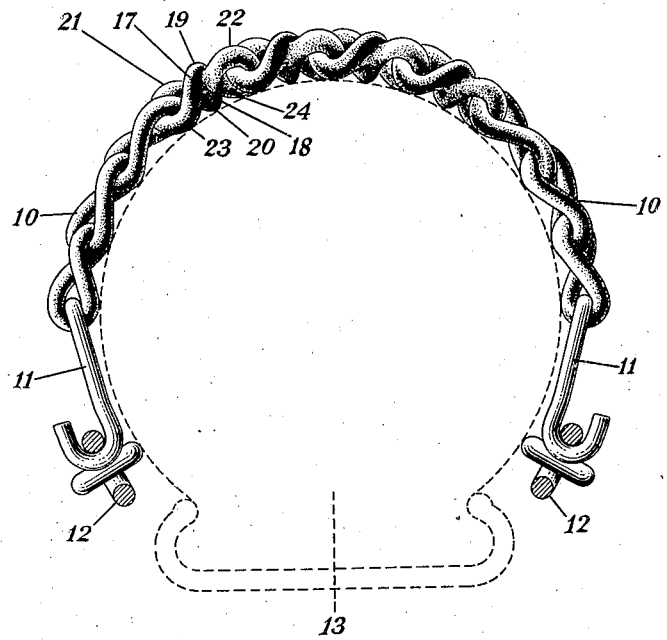
Fig. 1 is an elevation of one of the novel cross-chains indicated in operative relation to the tire of a motor vehicle.
Figure 2:
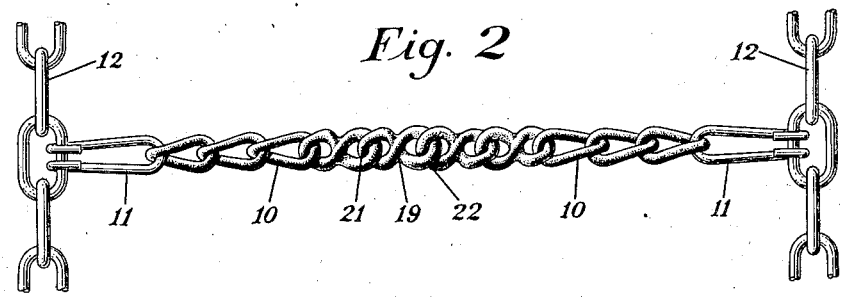
Fig. 2 is a plan view of a complete cross-chain as attached to side chains.

Referring to the drawing, more particularly Figs. 1 and 2, a plurality of the novel links are indicated as embodied in a cross-chain and occupying a substantial portion thereof which will be that designed to contact with the traction surface over which they are adapted to travel. Of course, the entire cross-chain could be thus constructed of the novel links; but as the same are somewhat more expensive than the usual and well-known type such as the links 10, a number of the latter are secured at either side of the chain portion of the novel links and, in turn, carry the hooks 11 for attachment to the side chains 12 of a tire chain. The relative location of these various elements and as applied to a tire 13 is more clearly set forth in Fig. 1 of the drawing.

Figure 3:
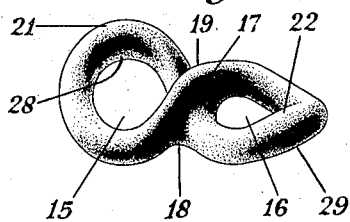
Fig. 3 is an enlarged perspective view of the novel cross-link.
Figure 4:
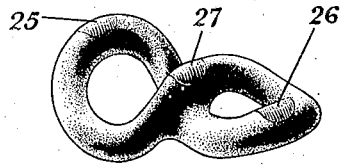
Fig. 4 is a similar view illustrating a modification.

The improved link, itself, is best seen in Figs. 3 and 4 and comprises a solid element having the circular eyes 15 and 16 disposed in its opposite ends, the link element as a whole being twisted intermediate said ends so that these eyes will be located in planes substantially at right angles to each other. At the intermediate portion, moreover, there is formed a pair of oppositely disposed convex enlargements or rib elements 17 and 18. These elements are inclined, preferably, at an angle of 45° to the longitudinal axis of a link or to the line of travel of same over a surface. The said ribs, furthermore, are raised sufficiently to cause their respective upper edges 19 and 20 to lie substantially in the same plane as the corresponding contact edges 21, 22 and 23, 24 upon opposite sides of the eye members 15 and 16. There are thus afforded for each link three distinct contacting points or wearing surfaces with the traction surface over which the vehicle carrying the chain travels. This will, therefore, assure greater efficiency in the holding action of the chain and reduce wear by distributing the same over the said three points of contact.

In order further to prolong the life of the link, the aforesaid wearing surfaces may be suitably hardened; but it is preferred to locate therein respective insert members 25, 26 and 27, Fig. 4 (the inserts of only one series of contacting edges having been shown because of difficulty of illustration). The inserts 26 are preferably located in their ribs transversely of the same, and, of course, at the highest portion, as is also the case with the surfaces of the eye members. These inserts may consist of an extremely hard metal or alloy, as stellite, or manganese or chrome steel, and may be suitably deposited or welded therein.

In operation, it will be apparent that the said inserts will wear more slowly than the surrounding softer body material of a link and will thereby afford slightly raised gripping elements which will further enhance the holding action of a cross-chain embodying said links.

By inclining the rib portions 17 and 18 at an angle to the direction of travel, the same will be effective in resisting sidewise and forward movement and thus tend to prevent skidding.

The holding action may be further enhanced by bulging outwardly or thickening slightly the cross-section of the eye members at the inside at points opposite the high contact edges, as at 28 and 29. This will provide greater wearing properties to the chain by delaying the wearing through of a link.

We claim:

1. A link for the cross-chains of a tire chain, comprising a solid element having eyes at its opposite ends located in planes substantially at right angles to each other, and with intermediate solid portions raised to afford opposite contact edges lying in the same plane with the corresponding high portions of the eyes.

2. A link for the cross-chains of a tire chain, comprising a solid element having eyes at its opposite ends located in planes substantially at right angles to each other, and with intermediate raised and oppositely disposed ribs and affording contact edges lying substantially in the same plane with the corresponding high portion of the eyes.

3. A link for the cross-chains of a tire chain, comprising a solid element having eyes at its opposite ends located in planes substantially at right angles to each other, and with intermediate raised and oppositely disposed ribs inclined to the longitudinal axis of the link and affording contact edges lying substantially in the same plane with the corresponding high portion of the eyes.

4. A link for the cross-chains of a tire chain, comprising a solid element having eyes at its opposite ends, located in planes substantially at right angles to each other, and with intermediate raised and oppositely disposed ribs inclined at an angle of 45° to the longitudinal axis of the link and affording contact edges lying substantially in the same plane with the corresponding high portion of the eyes.

5. A link for the cross-chains of a tire chain, comprising a solid element having eyes at its opposite ends provided with inner enlargements, said eyes being located in planes substantially at right angles to each other, and with intermediate solid portions raised to afford opposite contact edges lying in the same plane with the corresponding high portions of the eyes.

6. A link for the cross-chains of a tire chain, comprising a solid element having eyes at its opposite ends provided with inner enlargements disposed opposite the high portions of the respective eyes, said eyes being located in planes substantially at right angles to each other, and with intermediate solid portions raised to afford opposite contact edges lying in the same plane with the corresponding high portions of the eyes.

7. A link for the cross-chains of a tire chain, comprising a solid element having eyes at its opposite ends provided with inner enlargements disposed opposite the high portions of the respective eyes, said eyes being located in planes substantially at right angles to each other, and with intermediate raised and oppositely disposed ribs inclined at an angle of 45° to the longitudinal axis of the link and affording contacting edges lying substantially in the same plane with the corresponding high portion of the eyes.

In testimony whereof, we affix our signatures.

WILLIAM H. BRISTOL.
FRANK A. SMITH.